United States Patent [19]

Jacob et al.

[11] 4,324,566

[45] Apr. 13, 1982

[54] PROCESS FOR THE SEPARATION OR PURIFICATION OF MIXTURES BY THE USE OF A SOLID ADSORPTION

[75] Inventors: Philippe Jacob, Champagne en Valmorey; Daniel Tondeur, Neuves-Maisons, both of France

[73] Assignee: ELF France, Paris, France

[21] Appl. No.: 165,243

[22] Filed: Jul. 2, 1980

[30] Foreign Application Priority Data

Jul. 6, 1979 [FR] France ............................ 79 17624

[51] Int. Cl.$^3$ ............................................ B01D 53/04
[52] U.S. Cl. ........................................ 55/28; 55/74; 55/75
[58] Field of Search .................. 55/20, 27, 28, 67, 68, 55/74, 75

[56] References Cited

U.S. PATENT DOCUMENTS

| | | | |
|---|---|---|---|
| 2,818,137 | 12/1957 | Richmond et al. | 55/75 |
| 2,889,893 | 6/1959 | Hess et al. | 55/75 |
| 3,043,127 | 7/1962 | Ford et al. | 55/67 X |
| 3,225,521 | 12/1965 | Burow | 55/67 |
| 3,369,874 | 2/1968 | Wilhelm | 55/67 X |
| 3,542,525 | 11/1970 | Pigford et al. | 55/28 X |
| 3,581,465 | 6/1971 | Haruki et al. | 55/67 |
| 3,653,184 | 4/1972 | Drinkard et al. | 55/75 X |
| 3,660,967 | 5/1972 | Collins et al. | 55/75 X |
| 4,042,350 | 8/1977 | Phillips | 55/28 |

*Primary Examiner*—Robert H. Spitzer
*Attorney, Agent, or Firm*—Burgess, Ryan and Wayne

[57] ABSTRACT

A process for continuously separating the constituents of a mixture characterized in that it consists in introducing the gaseous mixture in an enclosure containing a selective adsorption agent or adsorbent, and subjecting the said mixture to a cyclical series of hot and cold steps induced by sudden variations of temperature between a temperature $T_c$ called the "hot temperature" and a temperature $T_F$ called the "cold temperature" in order to create in the cold steps three distinct zones moving in the flow-direction at different speeds:

a zone of low-speed propagation comprising a sorption front in which the concentration of gas having the most adsorbable constituents decreases;

a zone called the "thermal wave" induced at times determined by the sudden cooling of the load mixture;

a desorption zone where the mixture is enriched in the most adsorbable constituents.

17 Claims, 10 Drawing Figures

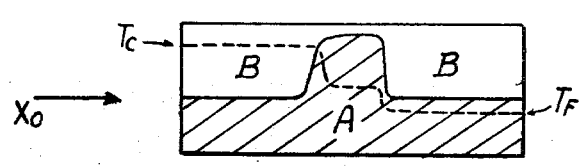
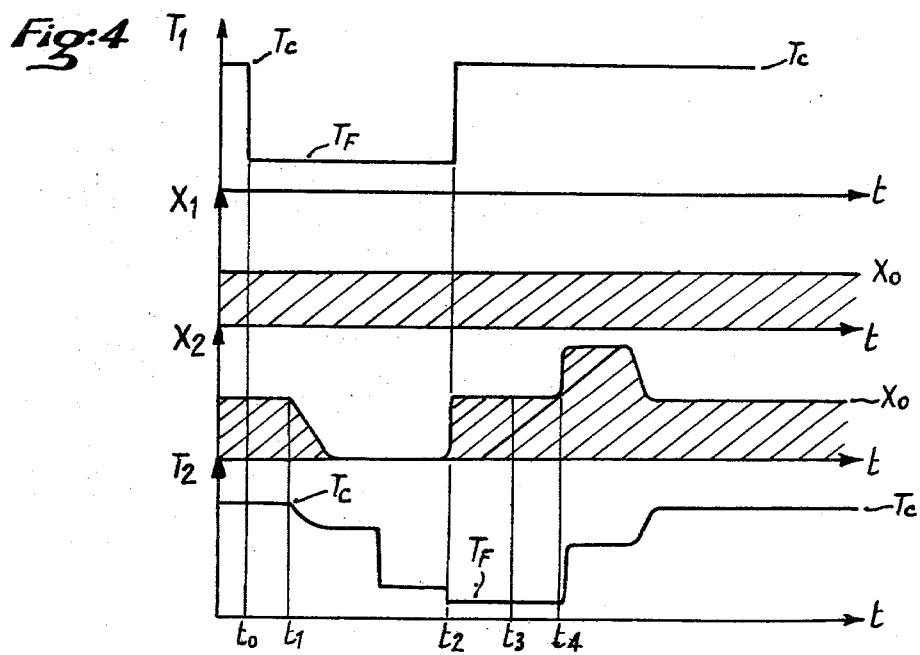
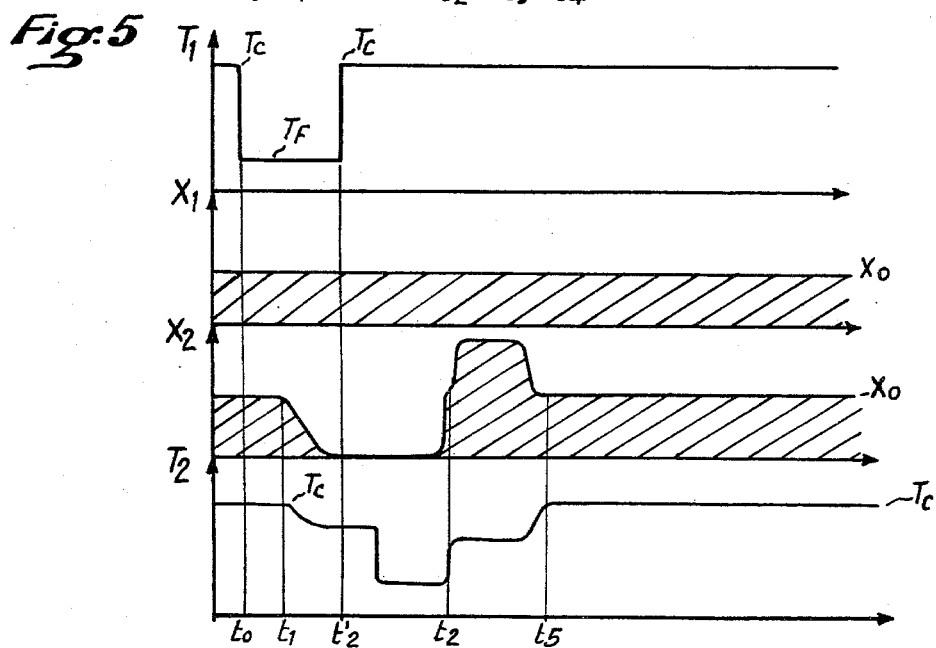

+ n-Pentane
× n-Butane
▽ Tc

PROCESS FOR THE SEPARATION OR PURIFICATION OF MIXTURES BY THE USE OF A SOLID ADSORPTION

The present invention concerns a process for the separation or purification of gaseous mixtures by the use of a solid adsorption agent or adsorbent. It concerns the operation of this process as well as its applications for industrial separations or purifications.

A known process consists in adsorbing the products to be separated in an enclosure containing a solid adsorbent, whereas at the outlet the products least retained by the solid adsorbent are collected, then in removing the residual mixture which has not been adsorbed and finally recovering the adsorbed substance(s) by the use of a desorption agent which can be thereafter easily separated from the components which are to be produced.

Another method for the separation of gaseous mixtures is elution chromatography which consists in feeding discontinuously the mixture to be separated into a vector gas flow forming an elution agent. The separation is obtained on a solid which selectively adsorbs the constituents of the feed. At the outlet the constituents initially contained in the feed are thus alternatively collected, separated from one another by the elution agent.

The two processes are characterized by the fact that their feed is discontinuous and that they use a third agent, i.e. an elution or desorption agent, which is easily separated from the constituents to be obtained.

Another process is cyclic zone adsorption in which the feed to be treated is passed continuously and without addition of an elution agent in a cascade of enclosures which are packed with a solid adsorbent and brought to cyclically variable temperatures. This process is applicable to systems for which the sorption phenomenon is sensitive to temperature, in order that the temperature variation of the first enclosure produces a separation which is then amplified in the subsequent enclosures.

This last process uses the amplification of the separation created through the use of a series of separators. It requires delicate operation since its correct operation depends on the synchronisation of the different separators, which limits its industrial applications.

The drawbacks of the existing processes are of three kinds:

the presence of an elution or desorption agent which dilutes the constituents of interest and which must thus be capable of being easily separated from the said constituents;

discontinuous feeding which encumbers the operation;

or the necessity of carrying out the separation in a cascade of high interdependent separators which involves a complex operation.

The object of the present invention is to supply a process for the separation or purification of gaseous mixtures on a solid adsorbent capable basically of being operated while using a single separation enclosure containing the adsorbent, continuously fed and without the addition of an elution or a desorption agent at any portion of the production cycle.

BRIEF SUMMARY OF THE INVENTION

The process according to the invention comprises in using temperature essentially as a separation vector inside the enclosure in which a solid adsorbent is contained, continuously fed by a load brought to a temperature $T_c$ called high temperature. When the adsorbent is saturated by the feed at temperature $T_c$, the temperature of the feed is then changed to bring it to a new constant value of temperature $T_F$. The temperature is allowed by develop freely in the enclosure under thermal on-set brought to the feed and the heat given off by the adsorbent or consumed by the desorption in the adsorbent sites.

The composition of the gas and the quantities adsorbed in the solid then vary in the enclosure due to the coupling which exists between the temperature and the adsorption phenomena. In fact, adsorption is an exothermic phenomenon and the quantities of a constituent which are adsorbed on a solid adsorbent in balanced conditions varies in relation with the temperature at which the balance is realised.

It is possible from the physicochemical data of the system, specific heat of the adsorbent and adsorption feed, to select high and low temperatures to which the feed is successively subjected in order to form in the enclosure containing the adsorbent three distinct zones moving in the direction of the feed flow at three different speeds;

1. the sorption front, the speed of which depends on the composition of the feed and the temperature $T_F$ of the feed;

2. a thermal cooling wave located down-stream of the sorption front in a zone where only the least adsorbable or the non-adsorbable constituents are left. The speed of this wave depends on the specific heat of the adsorbent and the specific heat of the least adsorbable gas, as well as the adsorption characteristics. In the case where this wave is located in a zone which only contains non-adsorbable constituents the speed of this wave is proportional to the average ratio:specific heat of the non-adsorbable gases/specific heat of the adsorbent;

3. a desorption front located down-stream from the thermal wave the speed of which depends on the composition of the feed and the initial temperature $T_c$ of the enclosure.

The zone located between the sorption front and the desorption front, in which only the non-adsorbable or least adsorbable constituents are left, and in which is located the cooling wave, tend to widen since the progression of the sorption front located down-stream from this zone is more rapid than the sorption zone upstream of this zone. When this zone exits the enclosure, the nonadsorbable constituents or the least adsorbable constituents according to the case, rid of other constituents, may thus be collected.

In addition, the sorption and desorption fronts act as in the discontinuous adsorption-desorption processes herein-above described and create a separation known as frontal analysis. For the desorption front, it is the least adsorbable or the non-adsorbable constituents which act as desorption agent.

BRIEF DESCRIPTION OF THE DRAWINGS

FIG. 3 illustrates a concentration and temperature profile of an adsorption bed at a time $t_3$ after an increase in the feed temperature.

FIG. 4 illustrates the variation with time of the effluent temperature, effluent composition with changes in feed temperature at constant feed composition.

FIG. 5 illustrates the variation with time of the effluent temperature, effluent composition with changes in feed temperature at a constant feed composition.

DETAILED DESCRIPTION OF THE INVENTION

Figure 1:
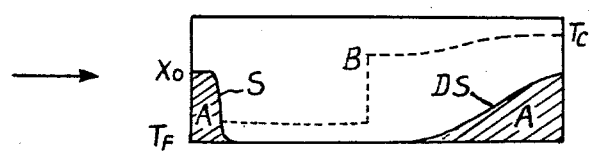
FIG. 1 illustrates a concentration and temperature profile of an adsorption bed at time $t_1$ after a decrease in feed temperature.

By this process, a part of the non-adsorbable constituent or a part of the least adsorbable constituent is separated from the remainder of the mixture and this fraction or cut may be collected at the exit of the enclosure containing the adsorbent. In addition, a frontal analysis of the adsorbable constituents is realized in an enclosure zone, as well as an elution of the adsorbable constituent by the non-adsorbable or least adsorbable constituent. Through separating the cuts in the zones as they exit the enclosure it is possible to recover fractions or cuts whose compositions are different from that of the feed.

These results are obtained without addition of a vector gas or a desorption agent. Throughout the entire duration of the process, the feed to the enclosure of the feed mixture is continuous. This process permits the obtention of one very pure fraction without the necessity of amplifying the separation by other enclosures operating in an identical manner.

This has no restrictive character and it is also possible in certain cases to dilute the load in the vector gas or amplify the separation between the adsorbable constituents by combining several enclosures.

The important feature of the process is the choice of high and low temperatures. In the absence of a correct choice of these two temperatures the three distinct zones defined herein-above do not form. The low temperature fixes the speed of the sorption front, which in this case is independent of the high temperature and the high temperature fixes the speed of the desorption front which is independent of the low temperature.

The choice of these temperatures may be made by calculating the speeds of the fronts when sufficient data on the adsorbable constituents is available, for example, the adsorption isotherms on the adsorbent used. This choice may also be made independently through separate adsorption or desorption experiments, while causing a thermal wave to propagate downstream from the sorption front or upstream the desorption front.

The existence of these two temperatures is a consequence of the choice of an adsorbent for which the adsorption isotherms of the constituents present in the load have initial gradients which decrease with the temperature.

In the process according to the invention heat is considered as a particular constituent which can be adsorbed or desorbed on a solid adsorbent. Thus for each adsorbable constituent of the mixture to be separated there may be defined, (without possibly for the least adsorbable in the case where the feed contains only adsorbable constituents) a particular temperature which is called here-after the inversion temperature $T_r$.

When the mixture to be separated contains only adsorbable constituents (or non-adsorbable constituents) the inversion temperature $T_r$ is defined for each adsorbable constituent as being the temperature for which the product:

total pressure in the separation enclosure [expressed in atmosphere]×initial gradient of the adsorption isotherm [expressed in (atmosphere)$^{-1}$] of the considered constituent is equal to the quotient:

specific heat of the adsorbent-adsorbate system, (when the adsorbate is only formed from molecules of less adsorbable gas)/specific heat of the less adsorbable gas, (or the quotient: specific heat of the adsorbent/average specific heat of the non-adsorbable gases).

The lowest of the inversion temperatures is thus the highest limit of the range in which the low temperature of the system must be sought.

The highest of these inversion temperatures is thus the lowest limit of the range in which the high temperature of the system must be sought.

It is possible to affect the values of the inversion temperatures by the choice of the adsorbent, the total pressure and a gaseous dilution agent.

Finally the choice of the high and low temperatures depends on the content of the adsorbable constituents in the feed.

Herein-after are illustrated different non-limiting working methods applied to the case where the feed contains an adsorbable gas and a non-adsorbable gas.

The appropriate $T_c$ and $T_F$ temperatures have been chosen in relation to the adsorbent used and the composition of the feed.

1st Working Method—Description of the Cold Stage Per Se

The adsorbent is maintained in a column fed continuously by the feed brought to the high temperature, said feed containing an adsorbable constituent A and a non-adsorbable component B.

At instant $t_0$ the temperature of the feed is decreased in order to bring it to the low temperature $T_F$ which is then constantly maintained. This creates in the column a cooling thermal wave followed by a slower sorption front S and preceded by a faster desorption front DS. FIG. 1 shows the speed of these fronts at instant $t_1$ subsequent to $t_0$ such as they appear on a photograph of the column at instant $t_1$.

This step is continued until the material located between the sorption and desorption fronts is displaced and exits from the column. This material contains only the non-adsorbable constituents B of the feed mixture. In FIG. 1 the arrow at the entry of the column shows the introduction of the load of composition $X_0$. The unbroken lines represent the sorption front S and desorption front DS.

Figure 2:
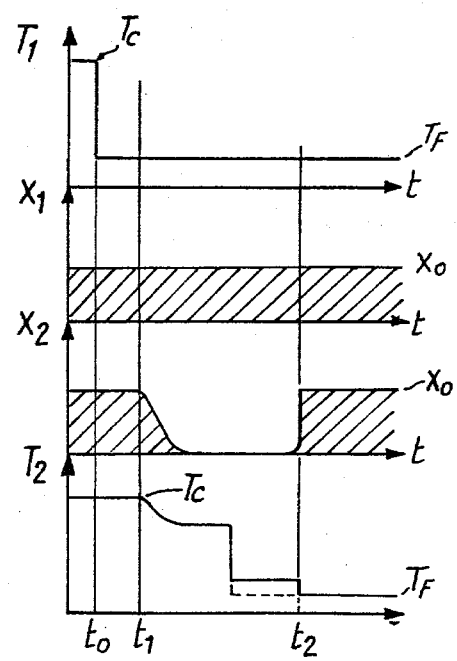
FIG. 2 illustrates the variation with time of the effluent temperature and composition with time after a change in feed temperature.

The broken line represents the evolution of the temperature from $T_F$ to $T_C$. FIG. 2 shows in function of time the evolution of the temperature $T_1$ of feed, of the temperature $T_2$ of the gas at exit, of the composition $X_1$ of feed and the composition $X_2$ of the gas at exit.

Instant $t_2$ where the column is again completely saturated, but however, at low temperature $T_F$, is noted.

2nd Working Method—Hot Stage Succeeding the Cold Stage

The column containing the adsorbent is fed continuously by the feed at high temperature. At the instant $t_0$ the operation proceeds as described in method No. 1. At the instant $t_2$ where the column is again completely saturated at the low temperature $T_F$ the temperature of the feed is again raised to bring it to high temperature $T_C$. This results in the desorption of a part of the adsorbable gas previously adsorbed. At the same time the column heats up progressively. FIG. 3 gives an image of the fronts in the column at instant $t_3$ subsequent to $t_2$. This step is pursued until the desorbed molecules are evacuated out of the column providing an enrichment, at the exit, in adsorbable gas. FIG. 4 shows in function of time the evolution of the temperature T1 of the charge, of the temperature T2 of the gas at the exit, of the composition X1 of the feed, and of the composition X2 of the gas at the exit. Instant $t_4$ where the desorbed molecules arrive at the exit of the column is noted.

3rd Working Method—Optimal Juxtaposition of a Hot Stage and a Cold Stage

The operation proceeds as in method No. 2 except that the load is brought to high temperature at the instant $t'_2$ before $t_2$, chosen in such a manner that the molecules desorbed by the re-heating of the column arrive at the exit at the same time as the sorption front created during the step where the temperature of the load had been brought to $T_F$. More precisely instant $t'_2$ is taken as equal to $2t_2 - t_4$. FIG. 5 shows in function of time the evolution of the temperature T1 of the feed, of the temperature T2 of the gas at the exit, of the composition X1 of the feed, and of the composition X2 of the gas at the exit. Instant $t_5$ where the column is again completely saturated by the feed at temperature $T_c$ is noted.

4th Working Method—Optimal Cyclic Chaining of the Hot and Cold Stages

The operation proceeds as in method No. 3, while renewing this operation at instant $t'_5$ chosen in such a manner that the desorption front, which is created when the feed is brought from $T_c$ to $T_F$ arrives at the exit of the column at the same time as the extremity of the enrichment front created at the preceding step where the temperature of the load was brought from $T_F$ to $T_c$.

Figure 6:
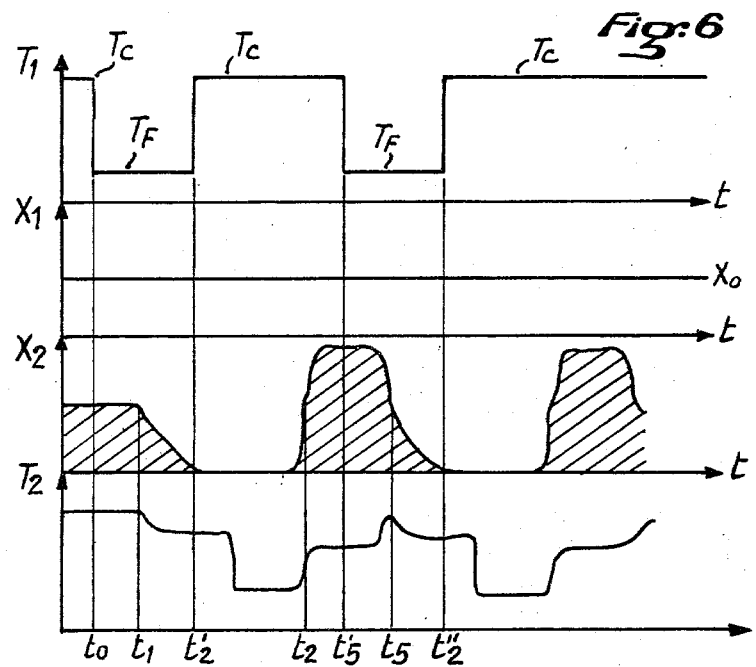
FIG. 6 illustrates the variation with time of the effluent temperature, effluent composition with changes in feed temperature at a constant feed composition through two temperature change cycles.

More precisely, the instant $t'_5$ is taken as equal to $t_5 - t_1 + t_0$. FIG. 6 shows in function of time the evolution of the temperature T1 of the feed and of the temperature T2 of the gas at the exit, of the composition X1 of the feed and the composition X2 of the gas at the exit.

In indefinitely repeating the process a composition of gas is obtained at the exit, which cyclically varies if the temperature of the feed at the entry cyclically varies. The cycles are determined from the cold and hot steps considered separately.

5th Working Method—Recycling

Figure 7:
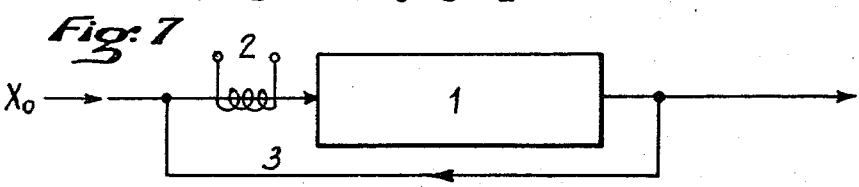
FIG. 7 illustrates an embodiment of the process where a portion of the effluent is recycled with the feed.

The operation proceeds as in method No. 4 but a constant fraction of the out-put of exit 3 is recycled continuously in the feed $X_0$; this results in the amplification of the separation if the variations of composition and temperature at the entry are synchronised. FIG. 7 gives the flow-sheet of this working method.

Figure 8:
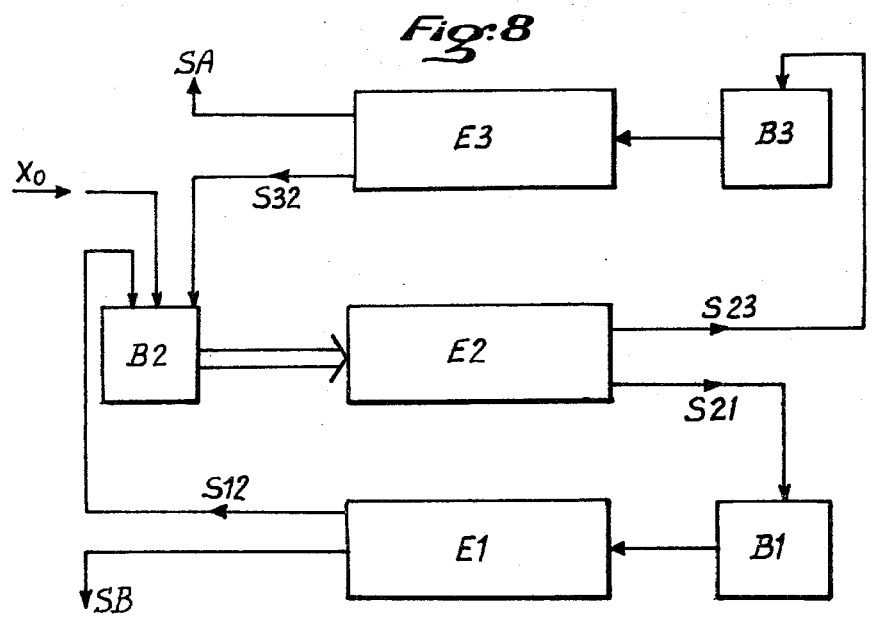
FIG. 8 illustrates an embodiment of the process wherein the effluent is passed in series through absorption beds.

6th Working Method—Disposition in a Cascade of Several Separation Enclosures According to an embodiment of the invention, several enclosures E1, E2, E3, . . . EN are disposed in a cascade, the feed temperatures of said enclosures varying cyclically in such a way that each successively produces an enriched and an impoverished fraction in the adsorbable constituent. FIG. 8 gives a flow-sheet in the case where $N = 3$. The feed is fed in an enclosure, in the present case E2. The enriched fraction S23 of enclosure E2 constitutes the feed of enclosure E3. The impoverished fraction S21 of enclosure 2 constitutes the feed of enclosure E1, B1, B2, B3 are the storage tanks.

Enclosure E3 produces a fraction enriched in adsorbable constituent SA.

Enclosure E1 operates as in method No. 4 and produces a fraction containing the non adsorbable constituent SB in a very pure state. The existence of a circuit of the enriched fraction rising from any enclosure K to enclosure $K+1$ until enclosure En is observed, which produces the adsorbable constituent, and a circuit of the impoverished fraction descending from any enclosure K to the preceding enclosure $K-1$ until enclosure E1 which produces the non-adsorbable constituent is also observed.

In order to operate the method according to the invention, it is necessary to choose for a given separation the adsorbate such that the initial gradient of the adsorption isotherms decrease quicker when the temperature increases, and thus allows the use of a low temperature and high temperature situated in a range easily obtained, for example, between 20° C. and 350° C.

In order to operate the method according to the invention the adsorbent is chosen in relation to the mixture to be treated among the mineral adsorbents such as active carbons, silica, alumina, alumino-silicates, metallic oxides or among the organic adsorbents such as polymers or copolymers, these adsorbents should be chosen in view of their adsorption cavity, the constituents of the feed, their selectivity and their sensibility to temperature in such a way that the inversion temperatures relative to each are found in an accessible range.

For each system constituted by the mixture to be separated and an adsorbent, it is possible, due to the criteria defined herein-above, to determine for a total given pressure, a low and a high temperature and the maximum concentration in the mixture of each of the adsorbable constituents, so that within the range of operating conditions as defined the process is applicable.

EXAMPLE

By way of non-limitative example the invention is illustrated by the operation of the process according to operating method No. 4 in the case where the mixture to be treated contains 95% isopentane, 4.5% n-pentane, 0.25% n-butane and 0.25% isobutane. The aim is to separate the branched hydrocarbons. Therefore, the adsorbent used is a molecular sieve of the 5A type, which adsorbs the n-butane and n-pentane but adsorbs neither the isopentane nor the isobutane. The inversion temperatures of the butane and pentane are in this case comprised between 250° C. and 300° C. for a total pressure of 1.2 bars. A low temperature of 64° C. and a high temperature of 340° C. are chosen. At the low temperature of 64° C. the content of n-pentane and n-butane in the feed is within the range where the process applies. The process uses a stainless steel cylindrical column having a diameter of 10 cm and a length of 1 m containing 5 kg of adsorbent in the form of rods having a length of 3 to 5 mm and a diameter of about 1.6 mm. The rate of feed is constant and equal to approximately 1.9 kg/h. The column is previously saturated at a temperature of 340° C. The head pressure in the column is about 1.2 bars. At instant t=0, when the column is uniformly saturated by the feed at 340° C., the feed temperature is suddenly brought to 64° C.

Figure 9:
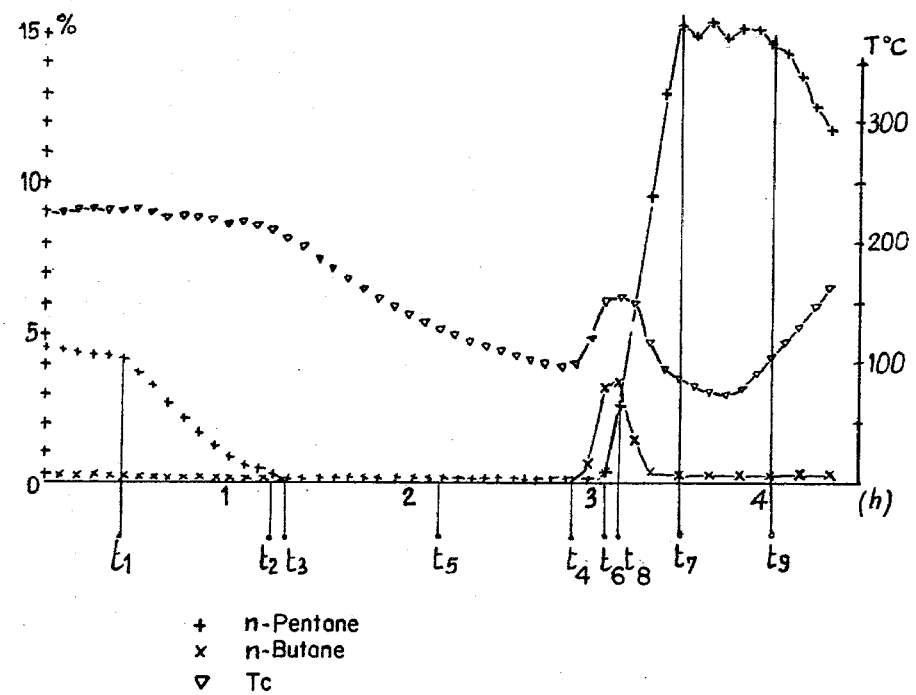
FIG. 9 is a graph showing the effluent temperature and composition with time of the process of the example.

The desorption front created in the enclosure arrives at the exit in instant $t_1 = 20$ minutes. At instant $t_2 = 1$ hr 20 min the n-pentane content is only 0.1%. From instant $t_3 = 1$ hr 25 min to instant $t_4 = 3$ hr a gas is collected at the exit which contains less than 0.04% n-pentane and n-butane and more than 99.7% isopentane and more than 0.2% isobutane. During this period the temperature of the gas at the exit varies between 212° C. and 101° C. At instant $t_5 = 2$ hr 10 min the temperature of the feed is brought again to 340° C. and maintained at this temperature. Between time $t_6 = 3$ hr 0.5 min and $t_7 = 3$ hr 30 min, the sorption front created when the temperature of the feed was at 64° C., and the desorbed molecules when the temperature of the feed was again brought to 340° C. exit together from the column. During this period the n-pentane content raises from 3.0 % to 15.3%. The n-butane content increases to 3.4% at the instant $t_8 = 3$ hr 10 min and settles thereafter at about 0.25%. From instant $t_7$ to instant $t_9 = 4$ hr 0.5 min the n-pentane of the gas at exit is never lower than 14.4%. the contents given in this description are volumic percentages. FIG. 9 shows in function of time the composition and the temperature of the effluent as measured at the exit of the column.

Figure 10:
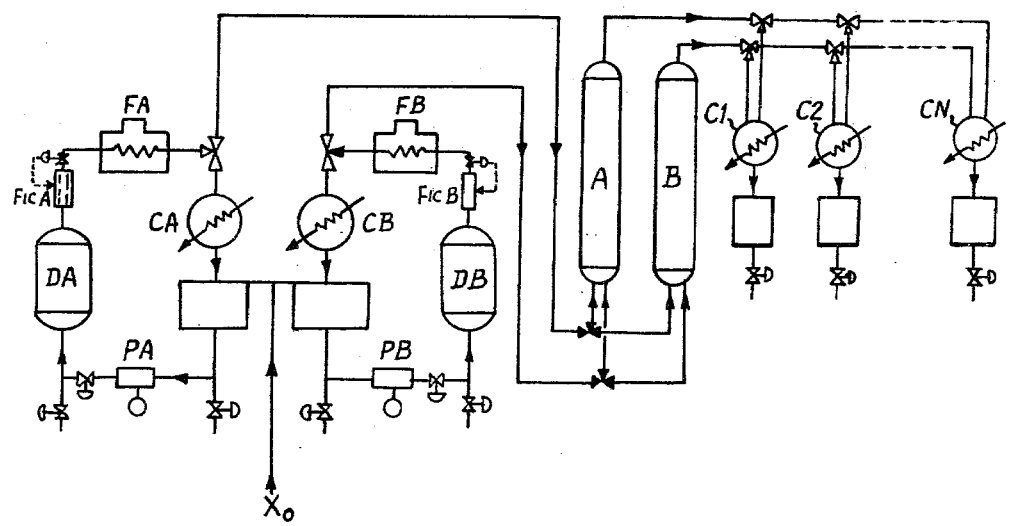
FIG. 10 is a diagrammatic representation of a commercial process of the invention.

FIG. 10 gives an example of a flow-sheet of an industrial process according to the invention operating on the principle described in operating method No. 4. It appears from this figure that the operation of the process according to the invention requires no particular or special installation and may be realized from pre-existing structures. In FIG. 10:

PA, PB represents the compressors;
DA, DB the dryers;
CA, CB, C1, C2 . . . CN the condensors;
FA, FB the ovens;
FICA and FICB the flow controllers
A and B are the enclosures containing the adsorbent.

The process according to the invention may be applied to the purification of industrial gases before recycling or to the separation of the constituents of the mixture. The present invention is in no way limited to the operating methods described and represented; it may be adapted to numerous embodiments known to a man skilled in the art, according to the applications envisaged and without departing from the spirit of the invention.

What is claimed is:

1. A process for the continuous separation of the constituents of a gaseous feed mixture which comprises introducing the gaseous feed mixture into an enclosure containing a selective adsorbent, and subjecting the mixture to a cyclical series of hot and cold stages by sudden variations in the feed temperature between a hot temperature $T_c$ and a cold temperature $T_F$ to create in the cold feed stage three successive distinct zones which move in the flow-direction at different speeds;
   (A) a first low speed zone of propagation comprising a sorption front in which the concentration of the most adsorbable constituents in the gas decreases;
   (B) a second zone called the "thermal wave" caused at times determined by the sudden cooling of the feed mixture to the cold temperature $T_F$, in which the only constituents left are the least adsorbable ones, this wave propagating at a speed higher than that of the first zone and proportional to the ratio:- specific heat of the non-adsorbable or least adsorbable gases/specific heat of the adsorbent;
   (C) a desorption zone the speed of whose propagation is higher than that of the preceding first and second zones, where the mixture is enriched in the most adsorbable constituents; the different effluent fractions or cuts being collected separately or recycled in the feed mixture.

2. A process according to claim 1 wherein the hot temperature is higher than the highest limit of the range of inversion temperatures defined for each adsorbable constituent.

3. A process according to claim 1 wherein the cold temperature is lower than the lower limit of the range of inversion temperatures defined for each adsorbable constituent.

4. A process according to claim 1 wherein when the mixture to be separated contains solely adsorbable constituents, the inversion temperature for each adsorbable constituent is the temperature at which the product of the total pressure in the enclosure (in atm.) × initial gradient of the adsorption isotherm (in atm.$^{-1}$) is equal to the quotient of the specific heat of the adsorbent/-specific heat of the least adsorbable gas.

5. A process according to claim 1 wherein when the mixture contains very slightly adsorbable gases, the inversion temperature for each very slightly adsorbable constituent is the temperature at which the product: Total pressure in the enclosure (in atm.) × initial gradient of the adsorption isotherm (in atm.$^{-1}$) = quotient of the specific heat of the adsorbent/average specific heat of the non-adsorbable gases.

6. A process according to claim 1 wherein at the outset the feed to the enclosure is at the hot temperature initiating the hot half-cycle.

7. A process according to claim 1 wherein at the out-set the feed to the enclosure is at the cold temperature initiating the cold half-cycle.

8. A process according to claim 1 wherein the feed mixture to be separated is diluted with a non-adsorbable gas prior to its injection into the enclosure containing the adsorbent.

9. A process according to claim 1 wherein a fraction or cut of the out-put at the exit is recycled into the feed.

10. A process according to claim 1 which comprises enclosures containing adsorbent which are in serial communication wherein an enriched gas is introduced serially into at least one additonal enclosure and a depleted gas is introduced serially into at least one additional enclosure whereby an enriched gas is produced at one extremity and a depleted gas at the other extremity.

11. A process according to claim 1 wherein the adsorbent is chosen as a function of the decreasing gradient of the adsorption isotherm of the constituents of the mixture and of its selectivity from mineral and organic adsorbents such as active carbon, silica, alumina, aluminosilicates, metallic oxides, polymers and copolymers.

12. A process according to claim 1 wherein the enclosure containing the adsorbent is a cylinder having a diameter between 5 cm and 10 m, and a length between 20 cm and 20 m.

13. A process according to claim 1 wherein the cold temperature is higher than $-100°$ C. and the hot temperature is lower than $500°$ C.

14. A process according to claim 1 wherein a pressure in the enclosure is between 1 and 50 bar.

15. A process according to claim 1, 2, 3, 4, 5, 6, 7, 8, 9, 10, 11, 12, 13 or 14 wherein the HVV (hourly volumic velocity) is between about 10 and 0.1, the HVV being the ratio hourly volumic velocity/volume of the enclosure.

16. A process according to claim 1 wherein the gaseous feed is a mixture of $C_4$ and $C_5$ hydrocarbons and the adsorbent is a molecular sieve of the 5A type.

17. Process according to claim 1 characterized in that the load is a mixture of $C_4$ and $C_5$ hydrocarbons and the adsorbent is a molecular sieve of the 5A type.

* * * * *